April 8, 1952
L. R. WEST ET AL
2,592,219
TRAILER HITCH DOLLY
Filed May 31, 1950
2 SHEETS—SHEET 1
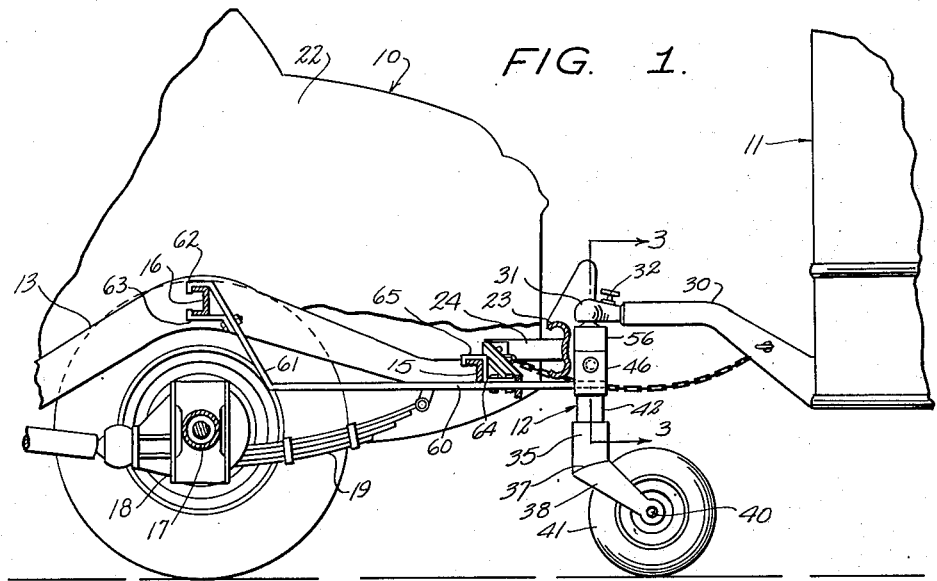
INVENTOR.
OVERBY B. STERETT,
LEONARD R. WEST,
BY
McMorrow, Berman + Davidson
ATTORNEYS.

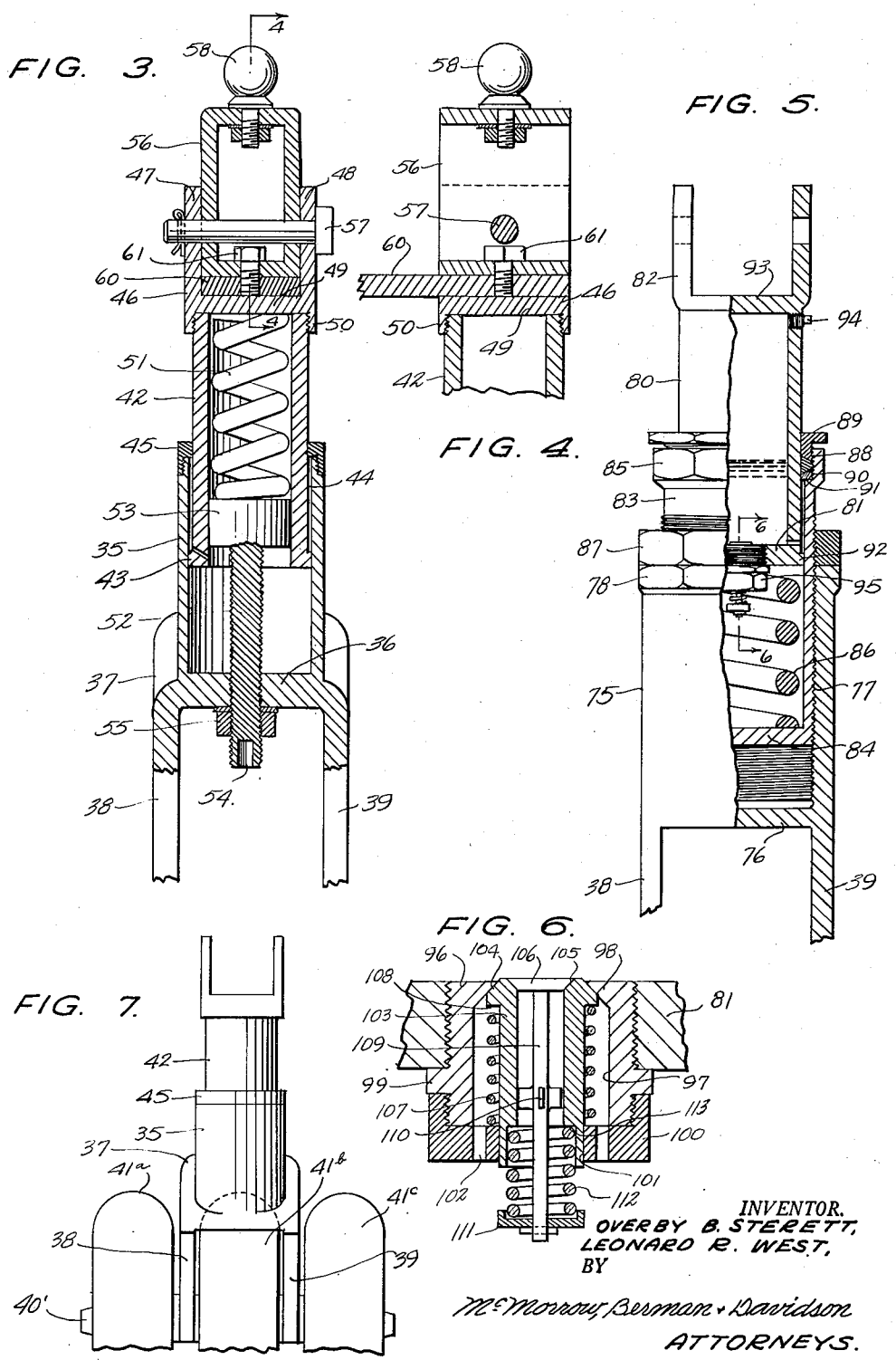

Patented Apr. 8, 1952

2,592,219

UNITED STATES PATENT OFFICE 2,592,219

TRAILER HITCH DOLLY

Leonard R. West and Overby B. Sterett,
San Diego, Calif.

Application May 31, 1950, Serial No. 165,266

4 Claims. (Cl. 280—33.4)

This invention relates to trailer hitch dollies and more particularly to a wheel supported dolly attachable to a towing vehicle to support the front end of a trailer vehicle and connect the trailer vehicle to the towing or tractor vehicle.

It is among the objects of the invention to provide an improved trailer hitch dolly which comprises a unitary assembly carried entirely by the tractor vehicle and to which the trailer vehicle is detachably connected, which is attached to the towing or tractor vehicle with no material modification of the vehicle construction so that the dolly can be detached from one towing vehicle and attached to another as may be desired, which supports the front end of the trailer vehicle so that it is unnecessary to use springs of increased strength in the tractor vehicle or to increase the air pressure in the tractor vehicle tires and yet does not diminish the traction of the tractor vehicle or materially affect the riding qualities thereof, which diminishes the load imposed by the trailer vehicle on the rear end of the tractor vehicle to such an extent that the rear end of the tractor vehicle is not materially depressed, which is easily adjustable to compensate for different heights of the rear end of the tractor vehicle above the ground and for different weights of the front end of the trailer vehicle, and which has a caster mounted wheel or caster mounted wheels which can trail the towing or tractor vehicle without lateral scrubbing on the roadway.

Other objects and advantages will become apparent from a consideration of the following description and the appended claims in conjunction with the accompanying drawings wherein:

Figure 1 is a somewhat diagrammatic side elevational view of a fragmentary rear portion of a tractor vehicle, a fragmentary front portion of a trailer vehicle and a hitch dolly illustrative of the invention connected between the tractor and trailer vehicles, a portion of the tractor vehicle being broken away and shown in cross section to better illustrate the application of the hitch dolly thereto;

Figure 2 is a top plan view of a fragmentary rear portion of the tractor vehicle frame, a fragmentary front portion of a trailer vehicle and a hitch dolly illustrative of the invention connected between the two vehicles;

Figure 3 is a longitudinal cross sectional view of a fragmentary portion of a hitch dolly illustrative of the invention;

Figure 4 is a cross sectional view on the line 4—4 of Figure 3 of a fragmentary portion of the dolly construction illustrated in Figure 3;

Figure 5 is an elevational view of a fragmentary portion of a modified form of hitch dolly, a portion being broken away and shown in cross section to better illustrate the construction thereof;

Figure 6 is a cross sectional view on an enlarged scale of a valve mechanism in the modified form of dolly shown in Figure 5 and is taken substantially on the line 6—6 of Figure 5; and Figure 7 is a front elevational view on a reduced scale of the hitch dolly illustrated in Figure 3.

With continued reference to the drawings, the combination shown in Figures 1 and 2 includes, in general, a tractor vehicle 10, a trailer vehicle 11 and a hitch dolly 12 connecting the front end of the trailer vehicle to the rear end of the tractor vehicle or towing vehicle and supporting the weight of the front end of the trailer vehicle.

The tractor vehicle may be a conventional automobile having a frame or chassis which includes two spaced apart and substantially parallel side frame members 13 and 14, a rear end cross member 15, an intermediate cross member 16 spaced forwardly of the rear cross member 15 and substantially parallel thereto, a rear axle 17 including a differential unit 18 disposed below the intermediate cross member 16, springs as indicated at 19 respectively connected between the frame side members 13 and 14 and the rear axle 17 near the respectively opposite ends of the latter, rear wheels 20 and 21 carried by the rear axle at the respectively opposite ends thereof and a body 22 mounted on the chassis or frame. A rear bumper 23 is disposed to the rear of the frame and connected to the rear ends of the frame side members 13 and 14 by the bumper brackets 24 and 25 respectively.

The trailer vehicle 11 may be a house trailer of some well known or desired construction supported intermediate its length on a pair of road wheels, not illustrated. A tongue 30 of triangular formation projects forwardly from the front end of the trailer vehicle 11 and carries on its front end a hitch element 31. In the arrangement illustrated the hitch element 31 is a ball socket member carrying a manually operated locking pin 32 for locking a complementary ball element in the socket to provide a universal joint connection between the trailer tongue and a hitch carried by the tractor vehicle.

The hitch dolly of the present invention comprises a cylinder 35 having an open end and having its opposite end closed by an end wall 36. A wheel fork 37 having two spaced apart and substantially parallel legs 38 and 39 is joined to the cylinder 35 at the closed end of the latter and the legs extend away from the closed end of the cylinder. Near their ends remote from the cylinder the legs 38 and 39 carry a transversely extending wheel axle 40 which is spaced from the longitudinal center line of the cylinder and a rubber tired road wheel 41 is journaled on the axle 40.

With this arrangement, when the cylinder 35 is supported in a substantially vertical position the wheel axle 40 will be substantially horizontally disposed and will be displaced from the substantially vertical center line of the cylinder to provide a caster effect for the wheel 41.

Where a light weight trailer is to be towed a single wheel may be carried by the wheel fork but where heavier trailers are to be towed the number of wheels may be increased to carry the additional weight disposed thereon. In the form of the invention illustrated in Figure 7, for example, the axle 40' is extended and three road wheels 41a, 41b and 41c are journaled on this extended axle, the center wheel 41b being disposed between the two fork arms 38 and 39, the wheel 41a being disposed at the outer side of the arm 38 and the wheel 41c being disposed at the outer side of the arm 39. Obviously, two wheels may be used with both of the fork arms disposed therebetween if such an arrangement is desired.

In the form of the invention illustrated in Figure 3, a hollow cylindrical piston 42 is received in the open, normally upper end of the cylinder 35 and the cylinder is both longitudinally and rotationally movable relative to this piston. An annular bead 43 extends around the outer surface of the piston at the end of the latter within the cylinder 35 and the cylinder is provided at its open end with an annular screw threaded recess 44. A nut 45 is threaded onto the cylinder at its open end and projects inwardly of the cylinder to provide a shoulder engageable with the bead 43 to restrain the piston against accidental separation from the cylinder.

A bracket 46 comprising a pair of spaced apart and substantially parallel apertured lugs 47 and 48 projecting from an end wall 49 is provided on the side of its end wall opposite the lugs 47 and 48 with an internally screw threaded annular boss or socket 50. The piston 42 is externally screw threaded at its upper end and threaded into the socket 50 to rigidly secure the bracket to the piston at the normally upper end of the latter.

A coiled compression spring 51 is disposed in the piston 42 and bears at one end against the end wall 49 of the bracket 47. The end wall 36 of the cylinder is provided with a centrally located tapped hole and a threaded stem or bolt 52 is threaded through the hole in the end wall of the cylinder and projects into the adjacent end of the piston 42.

A cylindrical head 53 is provided on the end of the stem 52 within the piston and this head is slidably received in the bore of the piston and provides an abutment for the adjacent end of the spring 51 so that the bracket 46 is resiliently supported on the wheel 41 by the spring 51. The head 53 is also rotatable in the piston so that the stem 52 can be threaded through the tapped hole in the end wall 36 of the cylinder, the stem being provided in its end remote from the head 53 with a wrench receiving socket 54 for this purpose. A lock nut 55 is threaded onto the stem 52 and bears against the outer side of the end wall 36 to lock the stem in adjusted position relative to the cylinder.

A hollow rectangular block 56 is received between the lugs 47 and 48 of the bracket 46 and is rigidly secured to the bracket by a pin 57 which extends through registering apertures in the lugs and in the side walls of the block. A ball element 58 is mounted on the normally upper side of the block 56, that is, the side of the block remote from the piston 42, which ball element is receivable in the complementary socket element 31 carried by the trailer tongue 30 and is locked in the socket element by the locking pin 32.

An arm or tongue 60 in the form of a flat metal bar is disposed at one end between the end wall 49 of the bracket 46 and the adjacent end wall of the block 56 and is rigidly secured to the block by a stud bolt 61 which extends through an aperture in the end wall of the block 56 and is threaded into a registering tapped hole in the arm 60.

In attaching the hitch dolly to the tractor vehicle the arm 60 is passed under the rear end cross member of the vehicle frame and extended forwardly of the vehicle to the intermediate cross member 16. Intermediate its length this arm is bent upwardly and forwardly, as indicated at 61, to compensate for the difference in height of the two cross members 15 and 16 and is provided at its end remote from the piston 42 with a hook formation 62 which engages over the cross member 16 at the mid-length location of this cross member. A hook shaped clip 63 is bolted to the arm 61 adjacent the hook formation 62 and engages the side of the cross member 16 opposite that engaged by the hook formation 62 to firmly secure this end of the arm 61 to the intermediate cross member 16.

A clip 64 is bolted to the arm 61 at the rearward side of the rear cross member 15 and is provided with a hook formation 65 which engages the upper side of the rear cross member to rigidly secure the arm 60 to the upper cross member at the mid-length location of this cross member.

An antisway bar 66 is disposed between the rear cross member 15 of the vehicle frame and the vehicle bumper 23 and secured at its respectively opposite ends to the bumper brackets 24 and 25. This antisway bar is longitudinally bowed toward the bumper 23 and is provided at its mid-length location with an aperture through which the arm 60 extends, the antisway bar rigidly supporting the arm 60 against any movement longitudinally of the frame cross member 15.

Eye bolts 67 and 68 are secured to the antisway bar 66 near the respectively opposite ends of the latter and safety chains 69 and 70 are connected to the eye bolts 67 and 68 by the snap hooks 71 and 72. The snap hook 71 is secured to one end of the chain 69 and the other end of this chain is secured to an eye bolt 73 mounted on the trailer tongue 30 while the snap hook 72 is secured to one end of the chain 70, the other end of which is connected to an eye bolt 74 mounted on the trailer tongue 30 at the side of the tongue opposite that on which the eye bolt 73 is mounted.

With the trailer hitch dolly 12 connected to a towing vehicle, such as an automobile, in the manner indicated above, after the socket element 31 of the trailer vehicle is secured on the ball element 58 of the hitch dolly the threaded stem 52 may be adjusted until the forward end of the trailer tongue is supported at an elevation at which the rear end of the towing vehicle is not depressed. The dolly then supports the weight of the front end of the trailer vehicle and connects the trailer vehicle to the tractor or towing vehicle but the spring 51 permits the wheel 41 to move up and down relative to the front end of the trailer vehicle and the rear end of the tractor vehicle as road inequalities are encountered.

In the modified form of the invention illustrated in Figures 5 and 6 the cylinder 75, corresponding to the cylinder 35, is internally screw threaded above its bottom wall 76, as indicated at 77, and is provided around its open end with a wrench receiving formation 78. The fork arms 38 and 39 extend from the closed end of this cylinder and carry the wheel axle 40 in the manner described above.

The piston 80, corresponding to the piston 42, is provided at its end opposite the bracket 46 with an end wall 81 having a screw threaded aperture therethrough and the bracket 82, corresponding to the bracket 46, may be formed integrally with the piston 80 at the corresponding end of the latter or may be secured to the piston by the screw threaded socket formation 50, as illustrated in Figure 3 and described above.

In the modified arrangement the piston 80 is not received directly in the cylinder 75, but an auxiliary cylinder 83 provided with external screw threads is threaded into the cylinder 75 and projects from the open end of the latter. The auxiliary cylinder 83 is provided at its end received in the cylinder 75 with an end wall 84 and is provided at its opposite end with an external wrench receiving formation 85 by means of which the auxiliary cylinder 83 may be threaded inwardly and outwardly of the cylinder 75. The piston 80 is received in the auxiliary cylinder 83 and a coiled compression spring 86 is interposed between the end wall 84 of the auxiliary cylinder 83 and the end wall 81 of the piston 80.

A lock nut 87 is threaded onto the cylinder 83 and bears on the cylinder 75 at the open end of the latter to lock the auxiliary cylinder in adjusted position in the cylinder 75. At its open end the auxiliary cylinder 83 is provided with a screw threaded internal recess 88 and a gland nut 89 is threaded into the open end of this cylinder. Suitable packing 90 is compressed between the gland nut 89 and a ring 91 disposed in the bottom of the recess 88 to provide a packed joint between the piston 80 and the auxiliary cylinder 83. An external bead 92 is provided on the piston at the end thereof within the auxiliary cylinder 83 which bead coperates with the ring 91 to provide a stop limiting movement of the piston outwardly of the cylinder.

The bottom wall 93 of the bracket 82 provides a closure for the end of the piston 80 opposite the end wall 81 and a body of hydraulic fluid is disposed in the auxiliary cylinder 83 and in the hollow piston 80 to hydraulically damp the movements of the piston in the cylinder. This fluid may be supplied to the interior of the piston and the cylinder through a filler operating in the piston adjacent the bracket 82, this filler opening being closed by a screw plug 94.

A valve assembly 95 is mounted in the screw threaded opening in the bottom wall 81 of piston 80 and illustrated in detail in Figure 6. This valve assembly comprises a cylindrical housing 96 provided with external screw threads and threaded into the opening in the piston bottom wall 81. This housing has a bore 97 extending coaxially therethrough and has an inwardly tapering valve seat 98 at the end thereof adjacent the interior of the piston 80. An annular bead 99 surrounds the housing 96 intermediate the length thereof and provides a shoulder which engages the outer side of the piston bottom wall 81 surrounding the aperture therein to limit movement of the housing through the piston wall.

An internally screw threaded, flanged cap 100 is threaded onto the housing at the end thereof opposite the valve seat 98 and is provided with a central aperture 101 and a plurality of apertures 102 smaller than the central aperture arranged around the central apertures at angularly spaced apart locations.

A tubular valve 103 is slidably mounted in the aperture 101 in the cap 100 and has a double beveled end providing a valve seat 104 cooperating with the valve seat 98 and a valve seat 105 disposed within the valve seat 104 and cooperating with the head 106 of a poppet valve mounted in the tubular valve 103. A coiled compression spring 107 surrounds the tubular valve 103 between the cap 100 and an external annular shoulder 108 on the tubular valve at the valve seat end of the latter and resiliently urges the tubular valve to closed position. The poppet valve has a stem 109 which extends through the tubular valve 103 and beyond the end of the latter opposite the valve seat end thereof. This valve stem is guided in the tubular valve by a spider formation 110 on the valve stem and carries a spring abutment washer 111 on its end opposite the head 106. A coiled compression spring 112 surrounds the valve stem between the abutment washer 111 and an internal annular shoulder 113 provided in the tubular valve 103 at the end thereof adjacent the abutment washer and this spring resiliently urges the head 106 of the poppet valve into closing relationship with the valve seat 105.

The spring 112 is stronger than the spring 107 and when the piston 80 is forced inwardly relative to the auxiliary cylinder 83 the hydraulic fluid acting on the side of the valve head 106 adjacent the end wall 84 of the cylinder 83 opens this valve against the force of spring 112 so that some of the fluid flows from the interior of the cylinder 83 into the interior of the piston 80, this fluid flow being restricted by the valve head 106 to provide a damping action on the spring 86. When the spring returns the piston 80 outwardly of the cylinder 83 the pressure differential between the interior of the piston and the interior of the cylinder 83 forces the valve 103 to open against the force of spring 107 permitting the hydraulic fluid to return to the interior of the cylinder 83. This return flow of the hydraulic fluid is also restricted but to a lesser extent than the flow of the fluid from the cylinder 83 into the piston 80. The double acting valve 95 thus provides a hydraulic damping action on the spring 86 and gives a shock absorbing operation to the trailer hitch dolly.

The arm 60 and the block 56 are secured to the bracket 82 of the modified form of the invention in the same manner in which they are secured to the first described form, and when the ball socket carried by the trailer tongue is mounted on the ball 58 carried by the modified form of hitch dolly, the dolly can be adjusted by turning the auxiliary cylinder 83 relative to the main cylinder 75 until the proper distance between the block 56 and the wheel axle has been obtained. When the proper adjustment has been obtained the lock nut 87 is threaded down to lock the dolly in properly adjusted condition.

The piston 80 is rotatably as well as slidably mounted in the cylinder 83 so that the caster wheels can swivel to track the towing vehicle without side scrubbing of the wheels.

With the entire hitch and dolly assembly connected to and carried by the towing vehicle, it is a simple matter to properly adjust the assembly for the best riding characteristics and traction efficiency of the towing vehicle and this arrangement also provides a more direct and positive connection between the towing and trailing vehicles increasing the safety of the hitch, especially in heavy traffic conditions and on winding and hilly roads, and eliminates the danger of the hitch becoming uncoupled when the vehicles pass over a sharp rise or depression in the roadway.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a towing vehicle and a trailer, a trailer hitch dolly for connecting the front end of the trailer vehicle to the rear end of the towing vehicle and supporting the weight of the front end of the trailer vehicle comprising a hollow piston, an arm secured at one end to said piston and rigidly secured to said towing vehicle for permanently connecting said dolly to the towing vehicle, a hollow cylinder receiving said piston in one end of said cylinder, a wheel fork extending from the other end of said cylinder, a wheel axle carried by said fork at a location spaced from the longitudinal center line of said cylinder, a wheel journaled on said axle, a compression spring disposed between said cylinder and said piston for resiliently supporting said piston in said cylinder, an abutment for said spring adjustably carried by said cylinder, and a coupling element carried by said piston at the end of the latter remote from said cylinder for engagement with a complementary coupling element on a trailer vehicle to provide a pivotal and separable coupling between said dolly and the trailer, said wheel being effective to support the weight of the front end of the trailer vehicle and said spring abutment being adjustable to accommodate the distance between said wheel axle and said arm to the height of the rear end of the tractor vehicle above the ground.

2. A trailer hitch dolly comprising a wheel supported cylinder, a piston slidably and rotatably received in said cylinder, an arm connected at one end to said piston and extending therefrom for attachment to a towing vehicle, a coupling element carried by said piston for engagement by a complementary coupling element on a trailer vehicle, a compression spring supporting said piston in said cylinder, a spring abutment for one end of said spring adjustably carried by said cylinder, said piston including a closed chamber, a double acting valve carried by said piston within said cylinder, and a body of hydraulic fluid in said cylinder and said piston, said fluid being movable through said valve to damp the action of said spring upon relative longitudinal movement of said piston and said cylinder.

3. A trailer hitch dolly comprising a wheel supported cylinder, a piston slidably and rotatably received in said cylinder, an arm connected at one end to said piston and extending therefrom for attachment to a towing vehicle, a coupling element carried by said piston for engagement by a complementary coupling element on a trailer vehicle, a compression spring supporting said piston in said cylinder, a spring abutment for one end of said spring adjustably carried by said cylinder, said piston including a closed chamber, a double acting valve carried by said piston within said cylinder, and a body of hydraulic fluid in said cylinder and said piston, said fluid being movable through said valve to damp the action of said spring upon relative longitudinal movement of said piston and said cylinder and said valve imposing a greater restriction on fluid flowing from said cylinder into said piston than on the return flow of fluid from said piston to said cylinder.

4. A trailer hitch dolly comprising a wheel supported cylinder, a piston slidably and rotatably received in said cylinder, an arm connected at one end to said piston and extending therefrom for attachment to a towing vehicle, a coupling element carried by said piston for engagement by a complementary coupling element on a trailer vehicle, a compression spring supporting said piston in said cylinder, and a spring abutment for one end of said spring adjustably carried by said cylinder, said spring abutment comprising an auxiliary cylinder adjustably threaded into said first mentioned cylinder and receiving said piston.

LEONARD R. WEST.
OVERBY B. STERETT.

REFERENCES CITED

The following references are of record in the file of this patent:

UNITED STATES PATENTS

| Number | Name | Date |
|---|---|---|
| 1,849,041 | Mabrito | Mar. 8, 1932 |
| 2,191,359 | Thornhill | Feb. 20, 1940 |
| 2,347,524 | Swan | Apr. 25, 1944 |
| 2,463,746 | Conley et al. | Mar. 8, 1949 |
| 2,463,926 | Ward | Mar. 8, 1949 |
| 2,500,686 | Jontz | Mar. 14, 1950 |